Figure 1:
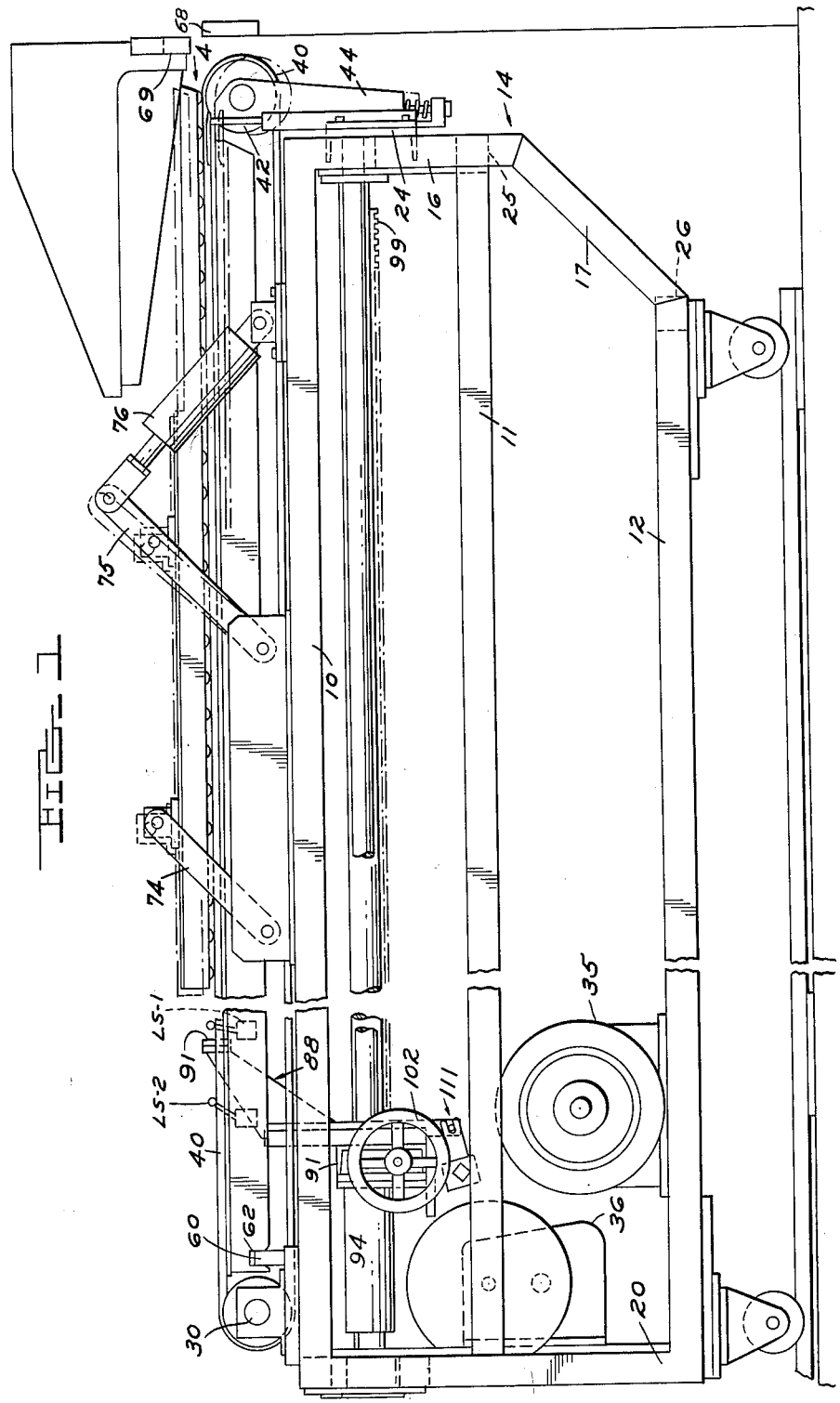

April 11, 1961 F. J. SEHN ET AL 2,979,186
SHEET MATERIAL HANDLING APPARATUS FOR
USE WITH A POWER SHEAR OR THE LIKE
Filed April 16, 1959 5 Sheets-Sheet 1

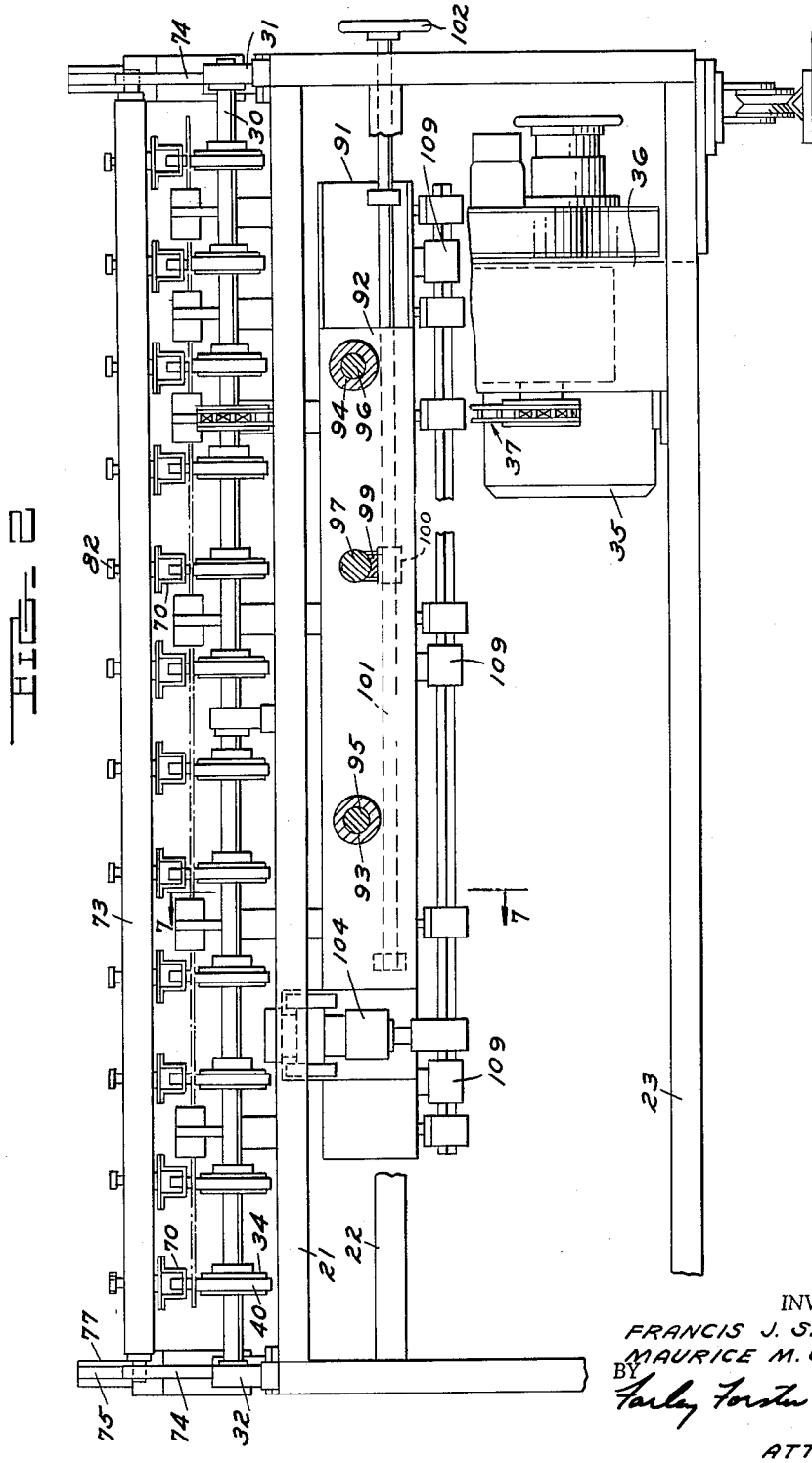

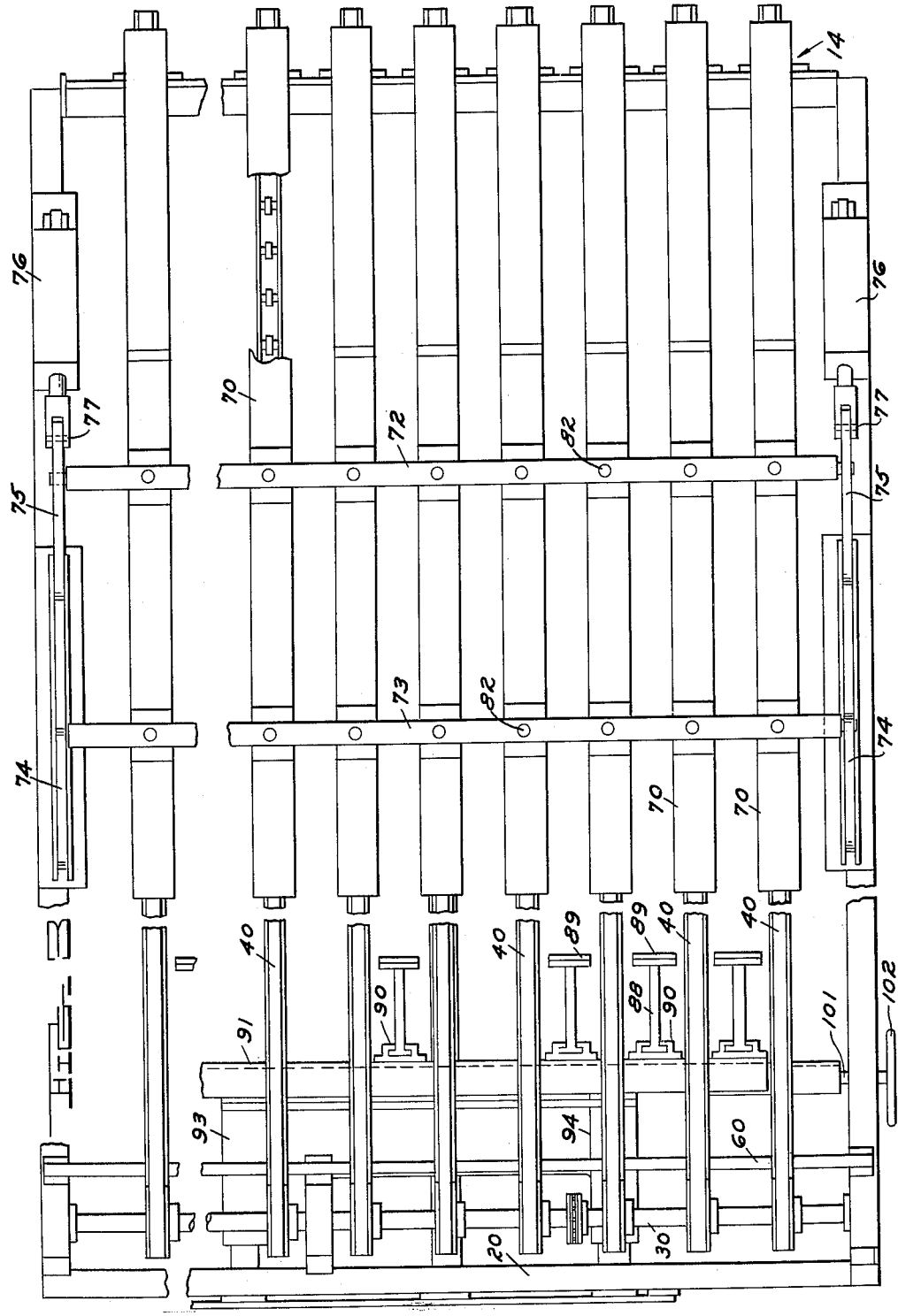

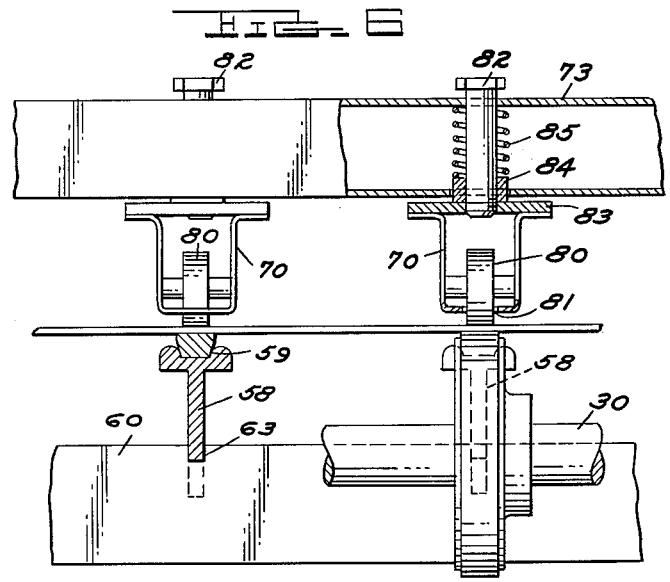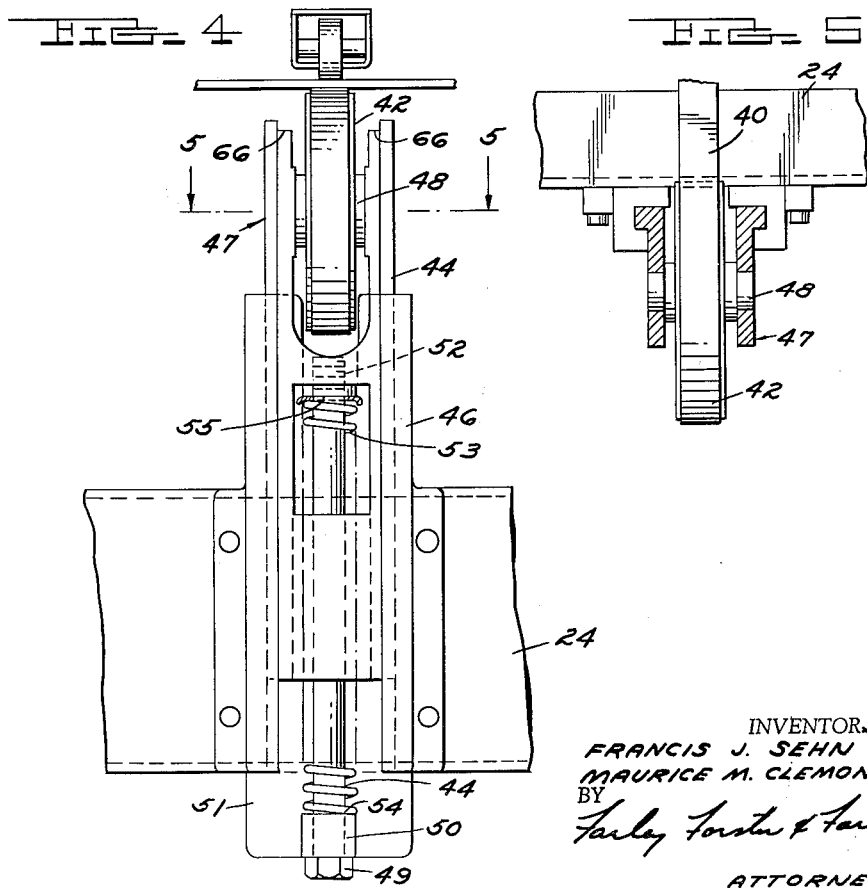

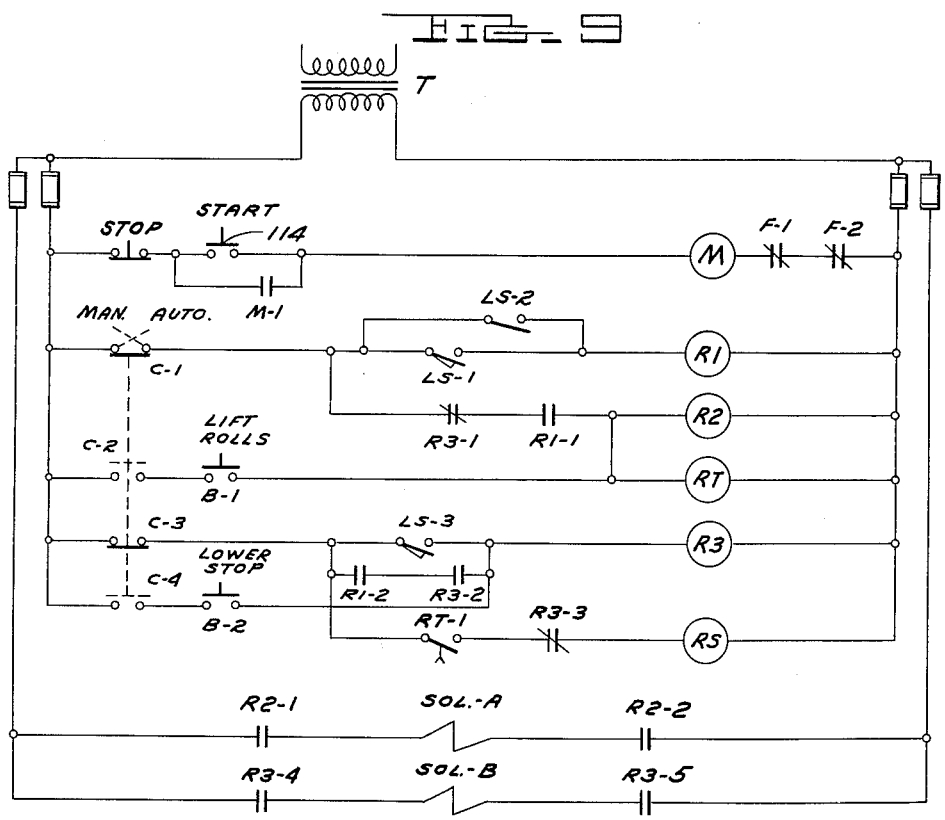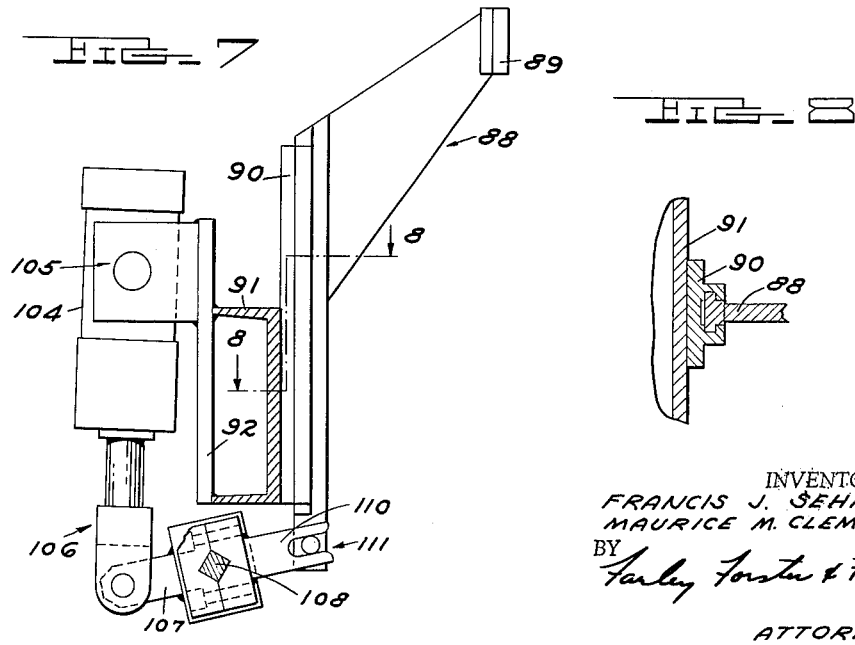

United States Patent Office 2,979,186
Patented Apr. 11, 1961

2,979,186

SHEET MATERIAL HANDLING APPARATUS FOR USE WITH A POWER SHEAR OR THE LIKE

Francis J. Sehn, 3515 Brookside Drive, Bloomfield Hills, Mich., and Maurice M. Clemons, Birmingham, Mich.; said Maurice M. Clemons assignor to said Francis J. Sehn Filed Apr. 16, 1959, Ser. No. 806,925

14 Claims. (Cl. 198—160)

This invention relates to improvements in apparatus for handling sheet material work pieces, such apparatus being particularly designed to be used with a shear or other machine which severs sheet material into work piece lengths. The improvements of the present invention relate generally to means for supporting and positioning the sheet material for more accurately severing a desired length of work piece.

Sheet material apparatus of the present type has conventionally consisted of a suitable framework on which a plurality of parallel spaced endless belts or chains have been mounted for movement in vertical planes so that means for supporting a length of sheet material is formed by the upper run of these endless members. The endless members are driven so that the sheet material can be moved in a feeding direction, and a feed roll is provided to urge the sheet material into contact with the moving belts.

Sheet material handling apparatus of this type is normally positioned on the discharge side of a shear and operates to draw sheet material through the shear blades to a pre-set work piece length determined by some form of gauging device. The shear is operated to sever the length of material which is then moved off the handling apparatus and a new length is fed through the shears for a repetition of the cycle.

The present invention is characterized by the improvement of providing a feed roll assembly which extends over a substantial portion of the length of each of the material supporting belts. This assembly is movable vertically relative to the material supporting belt surfaces a distance sufficient to reduce the frictional engagement between the supporting surfaces and the material supported thereby during the gauging operation and also during the actual shearing operation when the material is stationary. This feed roll assembly provides, in addition to the usual positive drive, a positive positioning of the material being severed on the supporting surfaces to prevent buckling, warping and other factors which would cause inaccuracies in gauging and shearing the desired length of material.

Further contributing to accurate gauging and shearing is the improvement of mounting each endless belt which forms a work piece supporting element so that the end thereof which is adjacent the material receiving end of the apapratus can independently move downwardly from a normal position during the shearing operation and be returned to a normal position after the shearing operation is complete. Cutting action of a shear is progressive and is therefore accompanied by a progressive change in elevation along the length of the cut. This results in a bending of the material being cut if the stock is light gauge, and also severe strains on the structure of the handling apparatus if the stock is of heavier gauge. In any event, this progressive change in elevation is also responsible for inaccuracies in sizing a work piece.

Thus, the combination of the feed roll assembly and the individually movable work piece suporting elements results in improved positioning and support of a work piece during the gauging and shearing thereof with greater precision in controlling the work piece size.

The present invention provides these improved features in a machine in which the feeding, gauging, shearing, and discharge of the work piece is automatically controlled. An example of such a material handling machine is shown in the accompanying drawings which are identified as follows:

Figure 1, a side elevation showing the handling apparatus and its relation to the blades of a shear;

Figure 2, an elevation showing the discharge end of the apparatus with parts thereof being broken away or shown sectionally;

Figure 3, a plan view of the handling machine shown in Figures 1 and 2;

Figure 4, an enlarged elevation of one of the work piece supporting elements taken as indicated by the arrows 4—4 of Figure 1;

Figure 5, a sectional view taken on the line 5—5 of Figure 4;

Figure 6, an enlarged sectional elevation taken as indicated by the arrows 6—6 of Figure 1;

Figure 7, an enlarged sectional view taken as indicated by the arrows 7—7 on Figure 2;

Figure 8, a sectional detail taken on the line 8—8 of Figure 7; and

Figure 9, a schematic diagram of a representative circuit for controlling operation of the handling apparatus and shear.

For convenience, the description of the machine illustrated will be broken down into the following components thereof:

(1) the frame structure and work piece supporting elements;
(2) the feed roll assembly;
(3) the gauging mechanism; and
(4) the overall operation.

*Frame and work piece supporting elements*

Referring to Figs. 1–3, a suitable frame structure is formed by two side frames of upper, intermediate and lower longitudinal frame members 10, 11 and 12 extending from the work piece receiving end 14 of the machine where they are interconnected by vertical members 16 and 17, to the work piece discharging end of the machine where they are interconnected by a vertical member 20. Suitable upper intermediate and lower transverse members 21, 22 and 23 interconnect the side frames to complete the basic frame structure at the discharge end of the machine, while an upper heavy channel member 24 together with intermediate and lower tubular members 25 and 26 extend transversely between the side frames at the receiving end of the machine.

A single shaft 30 extends transversely of the machine adjacent the discharge end thereof and is mounted in suitable bearing members 31 and 32. This shaft 30 supports a series of sheaves or pulleys 34 and is driven from a motor 35 and reducer unit 36 through a chain and sprocket drive generally designated 37. The reducer unit is preferably a variable speed type.

A belt 40 is trained about each of the pulleys 34. Each of these belts 40 is mounted in the same manner so as to form one element of a work piece support and therefore the mounting of only one belt will be described in detail. At the opposite work piece receiving end 14 of the machine, an idler pulley 42 is provided for each of the belts and means are employed for mounting each of these idler pulleys 42 for limited vertical movement relative to the frame structure of the machine and the pulley drive shaft 30 supported thereby, so that in effect, each belt or work piece supporting element can pivot to a limited extent about the drive shaft 30. In the construction shown, the supporting means for each idler pulley and belt consists of a bracket 44 slidably mounted in a guide 46 secured to the transverse channel frame member 24 (Figs. 4 and 5). Bracket 44 is formed with a bifurcated upper end 47 in which the pulley 42 is mounted on a shaft 48. The position of the bracket 44 relative to the guide 46 is established by a bolt 49 which extends slidably through a boss 50 at the lower end 51 of the guide and is threaded at 52 (Fig. 4) into the lower end of the bracket 44. A spring 53 is mounted about the bolt 49 and extends between the upper face 54 of the boss 50 and the lower face 55 of the bracket 44, urging the bracket normally upward to the limit defined by the bolt 49.

The upper run of each belt 40 is positively supported and guided by a T-shaped pivot bar 58 provided with a guiding groove 59 (Fig. 6). Each pivot bar 58 is supported on a cross member 60 adjacent the pulley drive shaft 30 for free rocking movement in a vertical plane as defined in part by complementary notches 62 and 63 (Figs. 1 and 6) formed in the bar 58 and cross member 60 respectively. The other end of each pivot bar is notched to straddle a portion of the idler pulley 42 and rests upon upper notched surfaces 66 of the pulley bracket 44.

As best shown in Figure 1, the idler pulley brackets 44 are all adjusted by the bolts 49 so that the upper surface of the belts 40 lies level with the lower shear blade 68.

Feed roll assembly (Figs. 1, 2, 3 and 6)

This assembly consists of a number of roll supporting members 70, there being one of such members for each of the belts 40. These roll supporting members are all carried by a pair of transverse tubular members 72 and 73. Member 73 is secured between the ends of a pair of links 74 while member 72 is secured intermediate the ends of a second pair of links 75. The position of each of the links 75 is controlled by an actuating cylinder 76 whose rod 77 is attached to a link end. Each of the roll supporting members 70 extends from the material receiving end 14 of the machine a substantial distance towards the discharging end of the machine. Preferably this distance is approximately equal to the maximum length of work piece that can be handled by the machine through the gauging mechanism to be described presently.

The construction and mounting of each of the members 70 is shown in Fig. 6, each member 70 being U-shaped in section and carrying a plurality of work piece engaging rollers 80 which project through slots 81. Each member 70 is secured to both of the transverse members 72 and 73 by the construction shown in Fig. 6, consisting simply in a bolt 82 extending through the tubular member 73 into threaded engagement with an integral plate 83 and cylindrical guide 84 which projects slidably into the tubular member 73. A spring 85 is positioned between the top of the cylindrical guide and the opposite inner wall of the tubular member and is selected to normally urge the feed roll member 70 downwardly.

The gauging mechanism (Figs. 1, 2, 3, 7 and 8)

A suitable number of gauge members 88, each having a gauge surface 89, are each positioned intermediate adjacent belts 40 and feed roll members 70 and slidably mounted for vertical reciprocating movement in a guide 90 which is secured to the face of a channel member 91. Channel member 91 together with a plate 92 and a pair of sleeves 93 and 94 form a box-like carriage which is mounted for movement longitudinally of the machine on two guide rods 95 and 96 engaging the sleeves 93 and 94. A rack 99 (Fig. 2) is mounted along the underside of a third guide rod 97 and is engaged by a pinion 100 mounted on a transverse shaft 101 carried by the carriage and rotatable by a hand wheel 102. Vertical position of the gauge members 88 is controlled by an actuating cylinder 104 mounted on the carriage as best shown at 105 in Fig. 7. The rod 106 of the actuating cylinder 104 is secured to a crank 107 on a shaft 108 which is suspended below the carriage structure on three brackets 109 (Fig. 2). Each gauge member 88 is engaged by one of a number of actuating arms 110 (Fig. 7) by a pin and yoke connection 111 so that oscillation of the shaft 108 produced by actuation of the cylinder 104 will cause the entire group of gauge members 88 to be moved upwardly or downwardly in their guides 92.

The gauge and carriage assembly is shown at approximately the limit of its movement toward the discharge end of the machine. In this position it will be observed that the feed roll members 70 extend from the receiving end of the machine to substantially the position of the gauge surfaces 89. When it is desired to sever work pieces of shorter length, the carriage is moved toward the receiving end of the machine by manipulation of the hand wheel 102 and the gauge members 88 traverse intermediate adjacent feed roll members 70.

The overall operation

The cycle of operation of the machine will be described with particular reference to the schematic circuit diagram (Fig. 9). Before beginning a cycle the drive motor 35 is energized by operating the start button 114 which controls the motor through a starting relay M and a conventional starting circuit, not shown. The normal condition of the machine at the completion of a cycle is that the feed roll assembly is lowered into feeding position and the gauge members 88 are raised into gauging position. A new cycle then consists of the following steps:

*Step 1.*—A sheet of material is passed through the shear blades and its leading end inserted between the moving belts 40 and the feed roll assembly. The material is then drawn toward the discharge end of the machine until the leading edge of the material contacts LS1 (Fig. 1) located on the gauge carriage just in advance of the gauge surfaces 89. LS1 is closed, energizing relay R1, energizing relay R2 by the closing of contact R1–1 and energizing time delay relay RT. Relay R2 controls the operation of feed roll solenoid valve A through contacts R2–1 and R2–2.

*Step 2.*—The feed roll assembly is raised slightly by actuating cylinders 76, reducing driving engagement between the belts 40 and the sheet material and allowing the material to be gradually and accurately advanced into contact with the gauge surfaces 89. After a time interval, time delay relay contact RT1 is closed energizing relay RS which controls the operation of the shear and initiates a shearing cycle. Upon completion of the shearing cycle, limit switch LS3, which is suitably mounted on the shear to sense that the shear cycle is completed, is closed energizing relay R3.

*Step 3.*—Relay R3 de-energizes relay R2 through contact R3–1 to lower the feed roll assembly, de-energizes relay RS through contact R3–3, establishes a holding circuit through contact R3–2 and energizes solenoid valve B through contacts R3–4 and R3–5. Solenoid valve B controls actuation of the gauge cylinder 104 to retract the gauge members 88 below the upper surface of the belts 40.

*Step 4.*—The severed work piece is then advanced off the discharge end of the machine. During this movement the work piece engages LS2 (Fig. 1) which is located on the discharge side of the gauge members 88. LS2 when closed, establishes a holding circuit to maintain relay R1 energized after the trailing end of the work piece has passed on out of contact with LS1. When the work piece has passed out of contact with both LS1 and LS2, relay R1 is de-energized, de-energizing relay R3 through contact R1–2 and consequently de-energizing solenoid valve B to cause the gauge members to be raised to gauging position.

These various steps can be controlled manually if desired by the auxiliary switch buttons B1 and B2 shown.

Attention is directed particularly to the following advantages obtained from the operation described:

(a) As the sheet of material is fed by the belts 40 and feed roll assembly into gauging position, the positive drive to the sheet material is broken by raising the feed-roll assembly slightly. This permits the sheet material to be brought into uniform contact with the gauge surfaces, and still positively positions the sheet material on the belt surfaces. Buckling or warping of the material cannot take place when it contacts the gauges. There is no need to interrupt the drive to the belts 40 from the motor 35 since positive feeding action is broken by upward movement of the feed roll assembly. The belts 40 are free to slip along the under surface of the sheet of material without unduly marking it or wearing the belts.

(b) During the shearing operation the sheet of material is held in accurate and positive position on the belt surfaces, yet as the upper shear blade 69 progressively moves across the sheet, that portion of the sheet underneath the blade and along the receiving end 14 of the machine is free to progressively move downward to the level defined by the shear blade. Each of the idler pulleys 42 and brackets 44 move downwardly in their guides 46 the required amount. The resulting deflection of the sheet material is a gradual one which does not cause any material dimensional inaccuracies.

While preferred embodiments have been described above in detail, it will be understood that numerous modifications might be resorted to without departing from the scope of our invention as defined in the following claims.

We claim:

1. Sheet material supporting and positioning means for handling apparatus of the type used with a machine such as a shear for feeding and gauging such material into work piece lengths, said supporting and positioning means comprising a series of parallel spaced supporting belts extending between the receiving and discharging ends of said handling apparatus, each of said belts being carried by one of a series of first pulleys mounted on a drive shaft adjacent and parallel to the said discharge end of said apparatus and by a series of second pulleys, means for mounting each of said second pulleys adjacent the receiving end of said apparatus, said mounting means being resiliently supported for limited downward movement from a normal position whereby each pulley of said second series can be moved independently of each other pulley of said second series, and means for positioning sheet material against said supporting belts in feeding contact therewith, said positioning means comprising a feed roll assembly having a series of roll carrying members each extending parallel to and above one of said supporting belts from a location above said second series of pulleys to a location adjacent said first series of pulleys.

2. Sheet material handling apparatus according to claim 1 further characterized by means for mounting said positioning means for vertical movement relative to said supporting belts to a position where feeding contact therebetween is broken.

3. Sheet material handling apparatus according to claim 1 wherein the means for mounting each pulley of said second series comprises a bracket, means securing said bracket to said apparatus for vertical movement and means resiliently urging said bracket upwardly to a defined limit.

4. Sheet material handling apparatus according to claim 3 wherein the means securing said bracket to said apparatus comprises a guide member in which said bracket is slidably mounted for vertical movement.

5. Sheet material handling apparatus according to claim 1 further characterized by the provision of a support and guiding member for each of said belts, means for pivotally mounting each of said guide members adjacent one pulley of said first series, said guide member extending under said belt to the corresponding pulley of said second series and having guide means for engagement by said belt, and means for supporting said guide member by said second pulley mounting means.

6. Sheet material handling apparatus according to claim 5 wherein said means for pivotally mounting each of said guide members comprises a bar extending parallel to said drive shaft, means for rockingly mounting each of said guide members on said bar in alignment with its respective belt, and each of said guide members being provided with a yoke portion which straddles said second pulley and engages said second pulley mounting means.

7. Sheet material handling apparatus of the type used with a machine such as a shear for feeding and gauging such material in order that it may be accurately severed into work piece lengths by such machine, said apparatus including a framework, sheet material supporting means and a gauging device mounted on said framework and being characterized by said supporting means including a series of parallel spaced endless belts, belt supporting means mounted adjacent the receiving and discharge ends of said framework and about which each of said belts is trained for movement in a vertical plane, means for driving said belts, a feed roll assembly carried by said framework and comprising a series of members each extending parallel to and above one of said belts from adjacent said receiving end of said framework to at least adjacent the location of said gauging device, means for moving said feed roll assembly vertically out of feeding contact with a sheet of material supported on said belts to a sheet material positioning elevation during contact between said sheet material and said gauging device, and means for holding said feed roll assembly in such positioning elevation during a severing cycle of said machine whereby said feed roll assembly serves to define an upper limit of movement for a sheet of material during the severing thereof.

8. Sheet material handling apparatus according to claim 7 further characterized by said belt supporting means at the receiving end of said framework including for each of said belts a pulley, means rotatably mounting said pulley on a horizontal axis, and means supporting said pulley mounting means for limited movement downwardly from a normal position.

9. Apparatus for use with a machine such as a shear for feeding and gauging work pieces of sheet material, said apparatus comprising frame structure, work piece supporting means carried by said frame structure and extending between the work piece receiving and work piece discharging ends thereof, said supporting means including a series of parallel spaced supporting belts, each of said belts being carried by a first pulley rotatably mounted on said frame structure on an axis adjacent and parallel to the said discharge end thereof and by a second pulley, means for individually mounting each of said second pulleys adjacent the said receiving end of said frame structure, each of said mounting means being resiliently supported for limited movement downwardly from a normal position.

10. Apparatus according to claim 9 wherein each of said second pulley mounting means comprises a bracket, means securing said bracket to said frame structure for vertical movement and a resilient member interposed between said frame structure and said bracket.

11. Apparatus according to claim 9 further characterized by a guide member for each of said belts, means pivotally mounting each guide member adjacent said first pulley, said guide member extending under the upper run of the belt carried by such pulley, and means for supporting said guide member on the said second pulley mounting means.

12. Apparatus according to claim 9 further characterized by a guide member for each of said belts, means supporting one end of said guide member on one of said second pulley mounting means, and means carried by said frame structure for pivotally mounting said guide member at a location spaced from said pulley mounting means toward the said work piece discharging end of said frame structure.

13. Sheet material handling apparatus according to claim 1 further characterized by said feed roll assembly including transverse members above said roll carrying members, and means suspending each roll carrying member from said transverse members, said suspending means including resilient means normally urging said roll carrying member downwardly out of contact with said transverse members, and means limiting such normally urged movement.

14. Apparatus according to claim 9 further characterized by sheet material positioning means located above each of said belts, and means mounting said positioning means for limited resiliently urged movement toward each of said belts.

References Cited in the file of this patent

UNITED STATES PATENTS

| | | |
|---|---|---|
| 555,481 | Grimmett | Feb. 25, 1896 |
| 2,269,714 | Fenton | Jan. 13, 1942 |
| 2,566,021 | Fergnani | Aug. 28, 1951 |
| 2,682,216 | Shields | June 29, 1954 |